Aug. 13, 1940.                F. M. DEUTSCH                 2,211,460
                    HEATING ELEMENT FOR VULCANIZING PATCHES
                         Original Filed Dec. 28, 1936
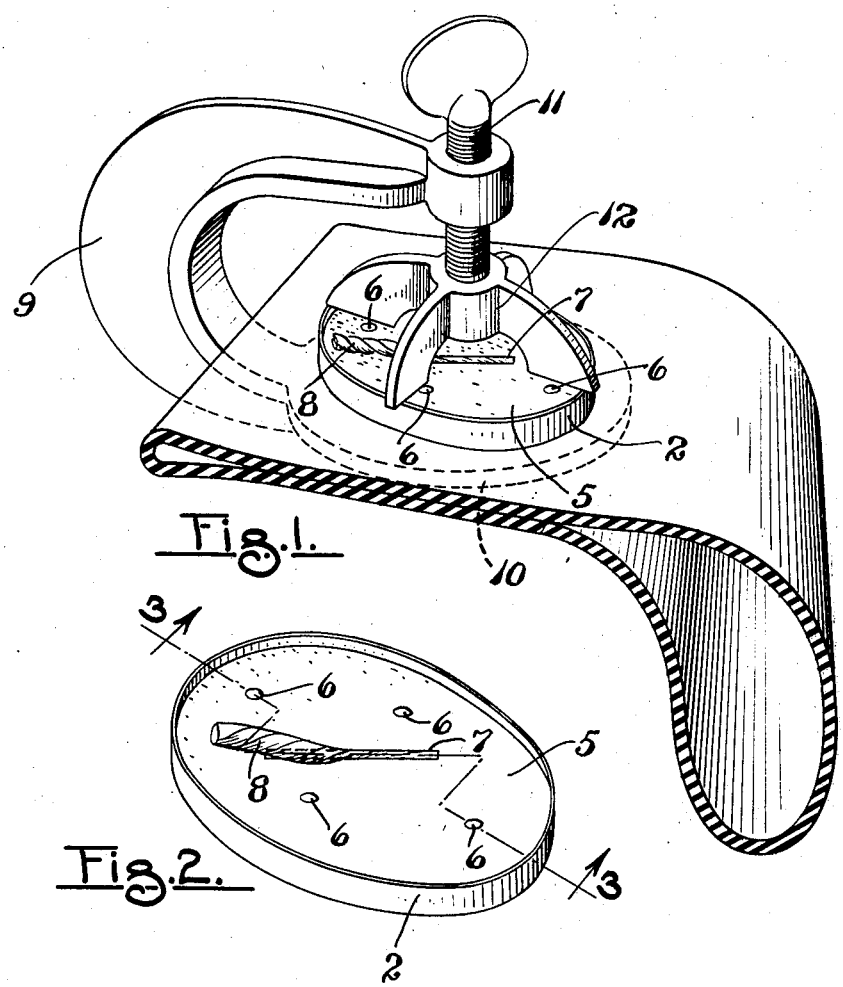
Inventor
Fritz M. Deutsch Patented Aug. 13, 1940

2,211,460

UNITED STATES PATENT OFFICE 2,211,460

HEATING ELEMENT FOR VULCANIZING PATCHES

Fritz M. Deutsch, Memphis, Tenn.; Fany Deutsch, executrix of Fritz M. Deutsch, deceased, assignor to Rite-Way Products, Inc., Memphis, Tenn., a corporation of Tennessee Application December 28, 1936, Serial No. 117,873
Renewed August 16, 1939

5 Claims. (Cl. 44—3)

This invention relates to a novel structure of heat producing element for a vulcanizing patch.

It has been common practice for a great many years to repair punctures in inner tubes of pneumatic tires by vulcanizing a patch of rubber over the puncture to completely cover the same, the vulcanizing of the rubber patch upon the tube providing a substantially integral joinder of the two.

The patch has been carried at the bottom of a sheet metal pan, adhering thereto. Within the pan a disk or wafer of fuel which is thoroughly combustible is located, and this fuel when ignited burns for an appreciable period of time, furnishing the heat required to vulcanize the patch to the tire. Of course, the vulcanizing of a rubber-patch to a rubber body other than inner tubes may be readily accomplished in the same manner.

The usual process is to support the inner tube or other article which is to have a patch vulcanized thereon upon a suitable rigid flat support, place the pan with the fuel disk thereon and with the rubber patch attached at the underside of the pan over the puncture and clamp the pan in place, thereby pressing the patch snugly against the rubber tube or other article to be repaired and ignite the fuel disk while the parts are in clamped position. The fuel very quickly ignites and becomes a glowing coal throughout its entire body. This furnishes a very high temperature because of the heat developed which lasts for the required time, generally approximating five minutes, for obtaining the proper vulcanization of the patch to the tire.

My invention is directed to the fuel disk and is concerned with a novel structure by means of which the disk body, which originally is of a dry fibrous and porous character, may be more quickly and easily impregnated with a solution of highly combustible materials. A further object of the invention is to so construct the fuel disk that the same means used to attain such complete impregnation and saturation of the body with the combustible materials also operates in the burning of the fuel to supply air for combustion so that there will not be incomplete combustion with a resultant smoking and loss of heat. And another object of the invention is to provide the means used for getting the quick and ready saturation of the disk and for supplying it with air for combustion, a means for readily securing a considerable portion of a lighting fuse, whereby the fuse is attached to the fuel disk instantly and without the use of any separate attaching means, and whereby a part of the body of the fuse is located within the body of the disk and the other part projects above it to be readily lighted.

For an understanding of the invention for the attainment of the objects stated, as well as others not enumerated at this time, reference may be had to the following description, taken in connection with the accompanying drawing, in which, Fig. 1 is a perspective view illustrating the manner in which a rubber article, such as an inner tube, is repaired by vulcanizing a patch thereon.

Fig. 2 is a perspective view of the patch unit used including the novel fuel disk of my invention, and Fig. 3 is a longitudinal section substantially on the plane of the broken line 3—3 of Fig. 2.

Like reference characters refer to like parts in the different figures of the drawing.

The fuel disk or wafer is held within a pan of thin sheet metal which may be of oval shape as shown, or any other desired shape, having a horizontal bottom 1 and upwardly extending continuous sides 2. The rubber patch 3 to be vulcanized in place is disposed below and adheres to the bottom of the pan and, in practice, at its lower face is usually covered with a protective fabric covering 4 which may be readily stripped from the patch when the vulcanizing is to take place.

The fuel disk 5 is of a shape so as to be received within the vertical sides 2 of the pan and is preferably of a thickness slightly less than the height of said sides. This disk usually is made from a porous fiber or paper board and is impregnated with a solution of readily combustible materials, all of which is well known to those skilled in this art.

With my invention a plurality of spaced apart vertical openings are made through the disk 5. There are shown four vertical openings 6 which in the drawing are located substantially on the major and minor axes of the elliptical disk and located inwardly a distance from the peripheral portions of the disk. In addition there is an elongated narrow slot 7 located preferably diagonally with respect to the major axis of the disk or at a position approximating an angle of 45° to both the major and minor axes of the disk in the form shown. It is, of course, to be understood that the particular location and positioning of the openings is not itself an essential feature of this invention as the openings may be arranged in a great many different ways.

Within the diagonal slot 7, after the disk has been treated with the solution of combustible materials a fuse 8 is inserted at one end. The width of the slot 7 is such that the end portion of the fuse which is inserted in the slot has to be contracted and squeezed therein so that the fuse is held by the grip against it made by the sides of the slot 7.

In producing the disk 5 it is cut from the stock of fiber or paper board material such as is used in the form desired, and either at the same time or at a subsequent time the holes 6 and the slot 7 are cut entirely through the disks. The disks are submerged in a solution of the highly combustible materials which are used to saturate the disks. Such solution entering the openings 6 and slot 7 as well as covering both the upper and lower sides of the disk and surrounding its peripheral edges, there is complete assurance that the whole body of the disk will be wholly saturated and impregnated with the solution. The disks are then dried and the igniting fuse 8 inserted at one end portion in the slot 7.

In using the vulcanizing unit for repairing a rubber inner tube, a clamp having a U-shaped body 9 with upper and lower arms is ordinarily used, the lower arm terminating in a table, indicated at 10, on which the article to be repaired by vulcanizing a patch thereto is placed. The vulcanizing unit is then placed over the puncture or opening in the tire which is to be repaired, having first removed the fabric at 4. The upper arm of the body 9 is vertically threaded at its end for the reception of a threaded thumb screw 11 which at its lower end carries a spider 12, usually with four arms as shown, which bear upon the upper edges of the sides 2 of the pan, two of the opposed arms lying substantially over the major axis of the elliptical pan and the other two over the minor axis. This brings the free end of the fuse 8 between two of the arms of the spider so as to be very accessible for lighting. If the pan and the disk therein are of a circular shape then it is desirable to locate the pan in a position such that the free end of the fuse will likewise lie between two of the arms of the clamping spider.

Lighting the fuse causes the fuse to burn and carries the fire into the slot 7 so as to ignite the fuel disk at many points in the length of the slot between the upper and lower sides of the disk. The combustible composition with which the disk is saturated includes oxygen producing elements in the presence of heat so that theoretically the entire mass of the disk in a very short time should be completely ignited and burn as a glowing coal. However, it has been found in practice that even though the oxygen produced by part of the ingredients with which the disk is saturated may suffice to get the wafer completely ignited throughout, there is frequently wholly insufficient oxygen for combustion after complete ignition has taken place whereby there is incomplete combustion, smoking and loss of heat and temperature to the detriment of the vulcanizing process. The openings 6 and the slot 7 furnish a plurality of means for the passage of air to various parts of the burning fuel disk and thus supply any necessary added amount of oxygen required to complete the combustion of the fuel disk and reduce the same to ash, with a minimum of incomplete combustion losses of heat and temperature or the production of low temperature at parts of the disk, and further reduces smoking and other usual effects of incomplete combustion.

In practice the fuel disk after it has been completely impregnated with the combustible solution is of a red color. The fuse 8 being of a white color there is produced a very distinctive and characteristic appearance.

This invention and improvements upon the fuel disks for vulcanizing units of the character described has proved very practical and useful for the purposes stated and for which it was designed. The invention is defined in the appended claims and is to be considered comprehensive of all forms of structure coming within their scope.

I claim:

1. A fuel disk of the class described comprising a disk impregnated with a combustible material, and an elongated fuse in contact with said material over a considerable area substantially in the center thereof, said fuse being frictionally held in contact with said material.

2. A fuel disk of the class described comprising a disk impregnated with a combustible material, an elongated recess extending substantially across said disk, and an elongated fuse, a portion of which is pressed into said recess and held therein by frictional engagement with the sides thereof, whereby the sides and bottom of said recess will be ignited simultaneously by the burning of the fuse.

3. A fuel disk of the class described comprising a disk impregnated with a combustible material, an elongated recess extending across said disk in substantially the center thereof, and a fuse having one end portion thereof located in said recess with the other end portion extending above the upper side of the disk, said fuse being frictionally gripped and held by the sides of said recess.

4. A fuel disk of the class described comprising a disk impregnated with a combustible material, and a fuse frictionally held in contact with said disk over a considerable area.

5. A fuel disk of the class described comprising a disk impregnated with a combustible material, and a fuse frictionally held in contact with a considerable portion of the vertical cross-sectional area of said disk.

FRITZ M. DEUTSCH.